(12) United States Patent
Weaver et al.

(10) Patent No.: US 7,926,270 B2
(45) Date of Patent: Apr. 19, 2011

(54) TURBOCHARGER WASTE GATE CONTROL

(75) Inventors: Corey Weaver, Ann Arbor, MI (US);
Ross Dykstra Pursifull, Dearborn, MI (US)

(73) Assignee: Ford Global Technologies, LLC,
Dearborn, MI (US)

( * ) Notice: Subject to any disclaimer, the term of this patent is extended or adjusted under 35 U.S.C. 154(b) by 617 days.

(21) Appl. No.: 12/015,568

(22) Filed: Jan. 17, 2008

(65) Prior Publication Data
US 2009/0183507 A1     Jul. 23, 2009

(51) Int. Cl.
*F02D 23/00* (2006.01)
*F02B 33/44* (2006.01)
*F02B 33/00* (2006.01)

(52) U.S. Cl. .............. 60/602; 60/612; 123/562

(58) Field of Classification Search .......... 60/602, 60/612; 123/562
See application file for complete search history.

(56) References Cited

U.S. PATENT DOCUMENTS

| | | | | |
|---|---|---|---|---|
| 3,035,408 A * | 5/1962 | Silver | ............................ | 60/602 |
| 4,477,875 A * | 10/1984 | Suzuki et al. | .................... | 60/602 |
| 4,516,401 A * | 5/1985 | Jackson | .......................... | 60/602 |
| 4,637,210 A * | 1/1987 | Yamamoto | ...................... | 60/602 |
| 4,697,421 A * | 10/1987 | Otobe et al. | .................... | 60/602 |
| 4,763,475 A * | 8/1988 | Toshio et al. | .................... | 60/602 |
| 4,856,481 A * | 8/1989 | Kamise et al. | .................. | 60/602 |
| 5,090,204 A | 2/1992 | Bonitz et al. | .................... | 60/612 |
| 5,155,998 A * | 10/1992 | Monden | ......................... | 60/602 |
| 5,271,228 A * | 12/1993 | Kawakami | ...................... | 60/602 |
| 5,487,273 A | 1/1996 | Elpern et al. | .................... | 60/602 |
| 5,729,980 A | 3/1998 | Mackay | .......................... | 60/602 |
| 5,755,101 A * | 5/1998 | Free et al. | ...................... | 60/602 |
| 6,205,784 B1 | 3/2001 | Knaack et al. | .................. | 60/602 |
| 6,810,667 B2 * | 11/2004 | Jung et al. | ...................... | 60/611 |
| 6,886,335 B2 * | 5/2005 | Tabata et al. | .................... | 60/602 |
| 7,047,740 B2 * | 5/2006 | Fukasawa et al. | .............. | 60/602 |
| 7,562,527 B2 * | 7/2009 | Eiraku | ............................ | 60/602 |
| 2003/0106539 A1 * | 6/2003 | Jung et al. | .................. | 123/559.1 |
| 2007/0289302 A1 * | 12/2007 | Funke et al. | .................... | 60/602 |
| 2008/0066723 A1 * | 3/2008 | Eiraku | ........................... | 123/564 |
| 2009/0183788 A1 * | 7/2009 | Bleile et al. | .................... | 137/527 |

* cited by examiner

*Primary Examiner* — Thai Ba Trieu

(74) *Attorney, Agent, or Firm* — Allan J. Lippa; Alleman Hall McCoy Russell & Tuttle LLP

(57) ABSTRACT

A method for improving turbocharger waste-gate control is presented. The method can reduce turbocharger flow oscillation, at least during some conditions.

24 Claims, 5 Drawing Sheets

TURBOCHARGER WASTE GATE CONTROL

FIELD

The present description relates to a method for controlling a turbocharger waste-gate that operates as part of an internal combustion engine.

BACKGROUND

Turbocharged internal combustion engines often have a waste-gate that can be opened to allow a portion of exhaust gasses to bypass the turbocharger's turbine. One way to actuate the bypass valve (also known as the waste-gate) is by an actuator that is comprised of a flexible diaphragm and spring. The spring applies a force to the diaphragm and lever connected to the diaphragm to keep the bypass valve closed when atmospheric pressure is present on both sides of the diaphragm. The valve can be opened by applying a gas pressure to the diaphragm. When the gas pressure overcomes the closing spring force, the waste-gate opens and a portion of exhaust gases bypass the turbocharger. One example of controlling a waste-gate in this way is described in U.S. Pat. No. 5,729,980. This patent describes a spring return pneumatically actuated waste-gate that is controlled based on engine speed. In particular, this turbocharger waste-gate actuator has two ports wherein gas pressure can act on the waste-gate diaphragm from either direction. This arrangement, when coupled with a throttle position sensor, is claimed to allow the waste-gate to remain closed for a longer period of time during full-throttle acceleration.

The above-mentioned method can also have several disadvantages. For example, the method simply controls the boost pressure depending on engine speed. In this arrangement, it may be possible to cause the spring assisted waste-gate valve to flutter or oscillate causing exhaust flow to the turbocharger to increase and decrease in an undesirable manner. This is especially true when the gas pressure used to open the bypass valve approaches the spring force that is applied to the diaphragm when the waste-gate is closed. In addition, this approach does not recognize or compensate part-to-part variations that can occur during manufacturing (e.g., spring rate variations) and that may result in uneven flow in dual turbocharger applications.

The inventors herein have recognized the above-mentioned disadvantages and have developed a method that offers substantial improvements.

SUMMARY

One embodiment of the present description includes a method to operate a turbocharger having a spring assisted waste-gate closing mechanism, the method comprising: applying a first force to operate a waste-gate actuator; applying a second force by a spring acting in opposition to the first force, the second force being the force applied when the waste-gate is in a closed position; commanding the first force to a level that is less than the second force when a desired force is less than the second force plus a predetermined force; and commanding the first force to a level that is greater than the second force plus the predetermined force when the desired force is greater than the second force plus the predetermined force. This method overcomes at least some disadvantages of the above-mentioned method.

Turbocharger waste-gate flutter can be decreased by ingenuously controlling waste-gate actuator forces. Specifically, when a spring return waste-gate actuator is used to regulate boost pressure, gas forces applied to the diaphragm side opposite the spring can be controlled to reduce the possibility of generating forces that are proximate to the spring force applied to a closed waste-gate. In other words, a control pressure (i.e., a pressure applied to the diaphragm side opposite the spring side) can be applied such that the force created by the control pressure acting on the diaphragm is not substantially equal to the closing spring force applied to the opposite diaphragm side. For example, if a spring applies X force to the waste-gate actuator diaphragm, control pressure acting opposite the spring is allowed to exert forces less than X minus a predetermined force or greater than X plus a predetermined force. In this way, control pressures acting in opposition to the spring force can be generated to provide a positive opening and closing of the waste-gate, thereby avoiding waste-gate flutter.

When the above method is applied to an engine having two parallel turbochargers, a further enhancement over previous waste-gate control methods can also be realized. Namely, by setting the force that can be applied by gases to a level that is offset from the nominal spring force, two turbocharger waste-gates may be opened simultaneously so that compressor flow is better equalized between the two turbochargers. In other words, when waste-gate opening is desired, applying a force greater than the closing force applied by either waste-gate closing spring promotes more positive waste-gate operation.

The present description can provide several advantages. For example, the approach can provide more uniform turbocharger compressor flow when a waste-gate is initially opened. Further, as mentioned above, the method can reduce turbocharger waste-gate flutter or flow oscillations when a waste-gate force balance is near zero. Further still, when the method is applied to two waste-gates of a twin parallel turbocharged engine, the waste-gates will open at substantially the same time, thereby providing improved boost regulation.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
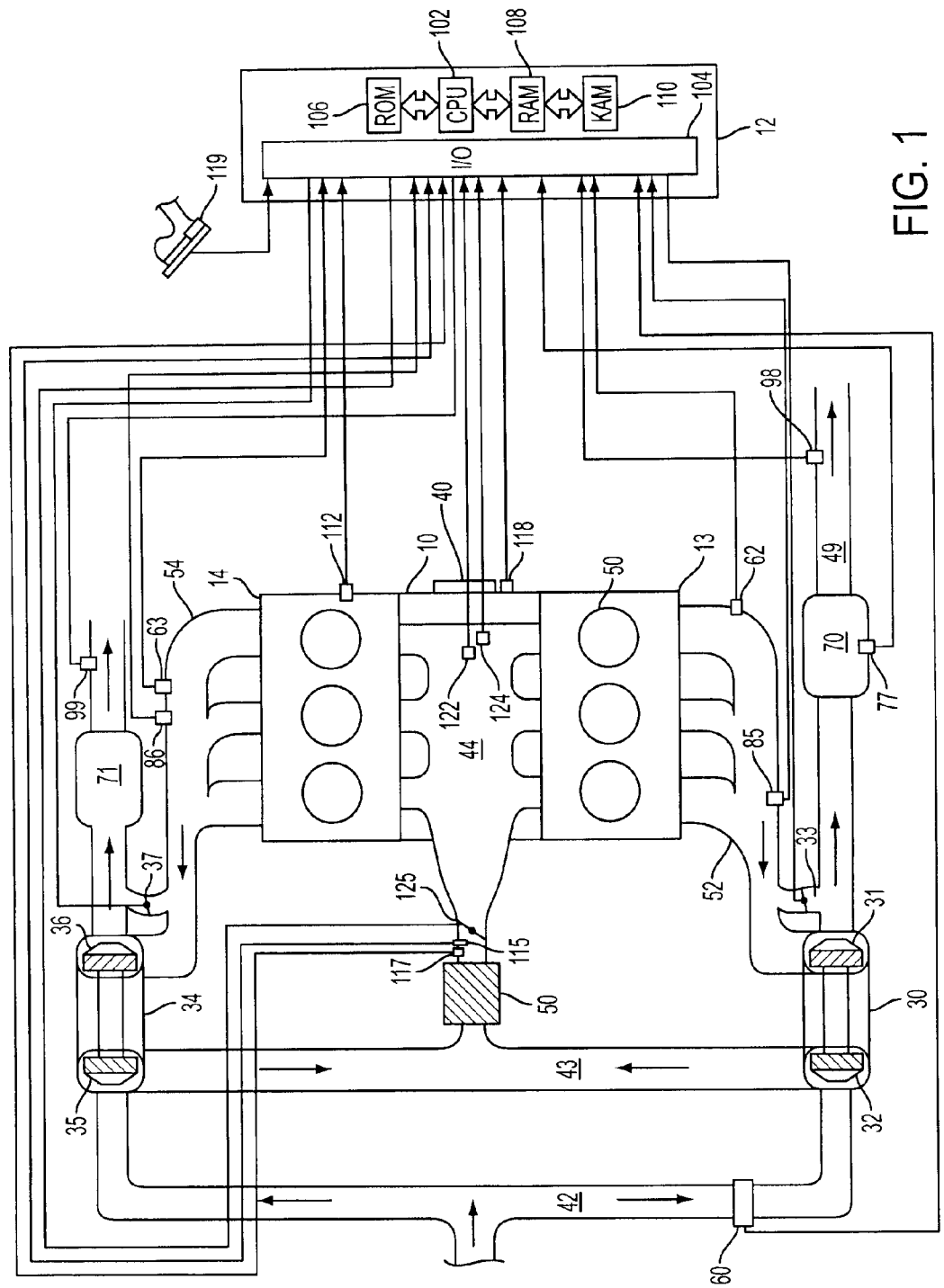
FIG. 1 is a schematic diagram of an engine configured to operate with two turbochargers.

Referring to FIG. 1, internal combustion engine 10 is controlled by electronic engine controller 12. Engine 10 includes a plurality of cylinders in a "V" configuration that are similar to cylinder 50. Cylinder banks 13 and 14 are comprised of three cylinders each. Intake cams (not shown) operate intake valves (not shown) to regulate airflow into the cylinders of banks 13 and 14. Exhaust cams (not shown) operate exhaust valves (not shown) to regulate exhaust flow out of cylinder banks 13 and 14. Timing of intake and exhaust cams relative to crankshaft position can be varied by adjusting phasers (not shown). Further, intake and/or exhaust valves may be configured to vary valve lift. Each cylinder surrounds a piston that transfers combustion energy to mechanical energy through crankshaft 40. Intake manifold 44 is in communication with electronically controlled throttle 125 and directs air to cylinder banks 13 and 14. Intake air is routed through duct 42 and mass airflow sensor 60 before being compressed by first turbocharger 30. A second turbocharger 34, also compresses air from duct 42. Compressed air is routed through duct 43 to intercooler 50 and proceeds to the inlet of electronic throttle 125. Combusted gases exit cylinder banks 13 and 14 through exhaust manifolds 52 and 54. Exhaust gases rotate turbines 31 and 36 of turbochargers 30 and 34, turbines 31 and 36 cause compressors 32 and 35 to rotate compressing fresh air. Waste-gates 33 and 37 (i.e., turbocharger control actuators) allow exhaust gases to bypass turbines 31 and 36 so that turbine work of each turbocharger can be controlled. Also, if desired, a single turbocharger can be used to compress fresh air for both cylinder banks.

Distributor-less ignition system (not shown) provides ignition spark to the cylinders of banks 13 and 14. Universal Exhaust Gas Oxygen (UEGO) sensors 85 and 86 are shown coupled to exhaust manifolds 52 and 54 upstream of catalytic converters 70 and 71. Alternatively, two-state exhaust gas oxygen sensors may be substituted for UEGO sensors 85 and 86. Two-state exhaust gas oxygen sensor 98 is shown coupled to exhaust pipe 49 downstream of catalytic converter 70. Alternatively, sensor 98 can also be a UEGO sensor. A second two-state oxygen sensor 99 is shown similarly situated. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example. A second catalytic converter 71 processes exhaust gases on the opposite cylinder bank.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112; a position sensor 119 coupled to an accelerator pedal; a measurement of engine manifold pressure (MAP) from pressure sensor 122 coupled to intake manifold 44; crankshaft position 118; exhaust manifold pressure 62-63; throttle inlet air pressure 115; throttle inlet air temperature 117, and a measurement (ACT) of engine air amount temperature or manifold temperature from temperature sensor 124.

The engine described in FIG. 1 may be the primary means of generating motive force in a vehicle or it may be part of a vehicle having more than one means for generating motive force, a hybrid vehicle for example. The engine may generate wheel torque in conjunction with an electric motor when in a hybrid configuration. Alternatively, the engine may generate wheel torque in conjunction with a hydraulic motor. Thus, there are many configurations whereby features of the present description may be used to advantage.

Controller 12 storage medium read-only memory 106 can be programmed with computer readable data representing instructions executable by processor 102 for performing the methods described below as well as other variants that are anticipated but not specifically listed.

Figure 2:
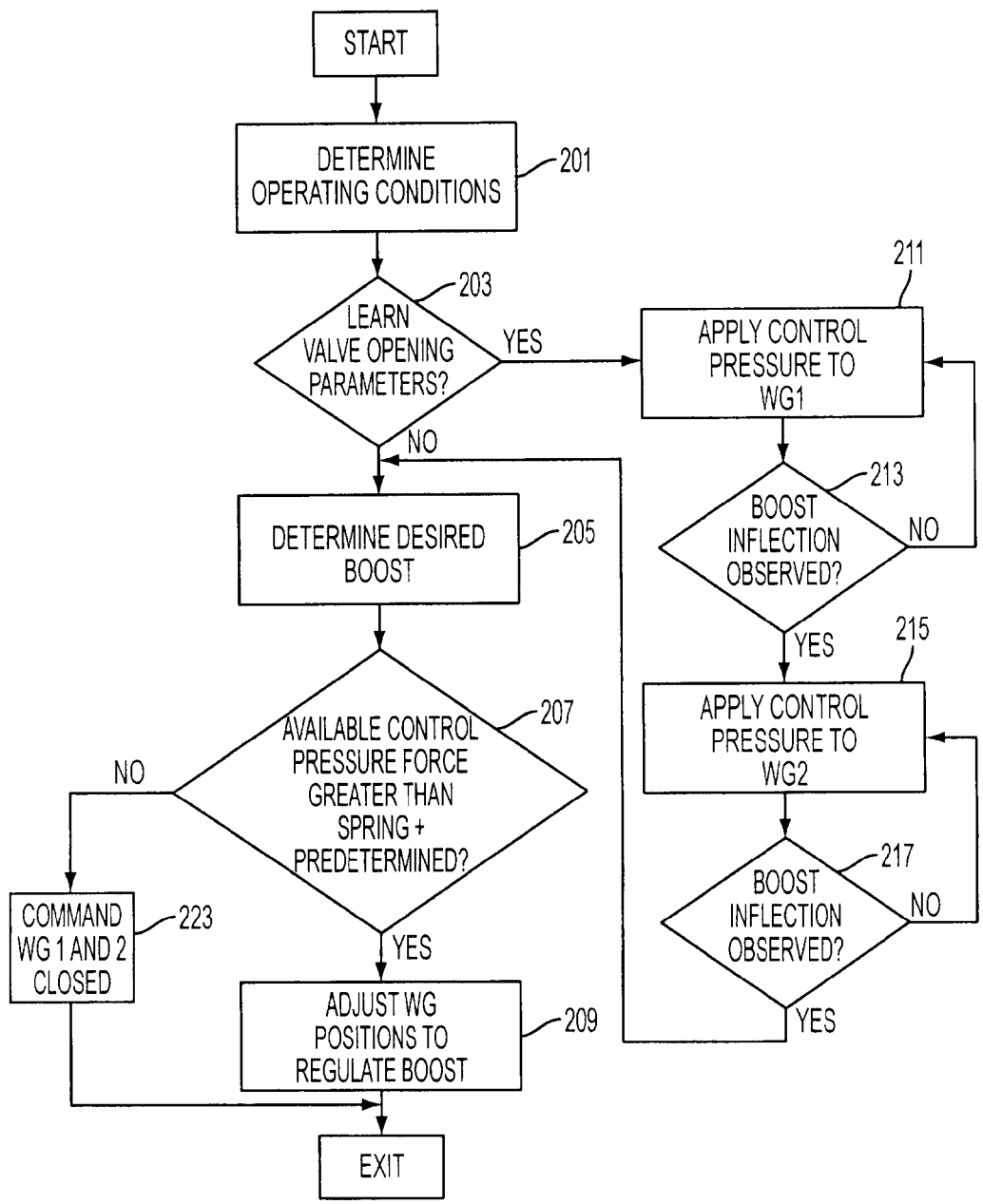
FIG. 2 is a flowchart of an example waste-gate control method.

Referring now to FIG. 2, a flow chart of an example waste-gate control method is shown. The method of FIG. 2 can be used to control a system with one or two turbochargers having spring assisted waste-gate actuators (see FIG. 3 for an example waste-gate actuator). The method begins to open waste-gate when boost pressure generated by the turbocharger compressors reaches a level that can provide sufficient force to overcome the valve closing spring plus a predetermined offset force. This forms a pneumatic control system that can limit boost to a fixed level. The predetermined offset force can be used to represent manufacturing variation in spring force and valve seating frictional forces. In one embodiment, the offset force is selected to be a force that exceeds manufacturing and waste-gate seating forces by 0.6 N.

The method also describes a way to determine the force at which the waste-gate begins to open. This feature allows the controller to change the estimated spring closing force (i.e., the amount of force the waste-gate closing spring applies to the waste-gate diaphragm when the waste-gate is in the closed position) so that the predetermined force does not have to be large to promote positive opening and closing control. In addition, when spring closing forces are determined for two turbochargers, the method can determine a control pressure that delivers a force at which both waste-gate actuators positively open.

At step 201, operating conditions are determined. Operating conditions may include engine operating conditions (e.g., engine speed, driver torque demand, and/or cylinder air charge), turbocharger operating conditions, ambient temperature, ambient pressure, and engine operating time, for example. After determining operating conditions the routine proceeds to step 203.

At step 203, the routine determines if waste-gate valve opening parameters are to be determined. In one example, waste-gate actuator spring closing force may be determined after a predetermined number of engine starts. In another example, waste-gate actuator spring closing force may be determined at specific operating temperatures or at predetermined operating intervals. In still another example, waste-gate actuator spring closing force may be determined in response to a boost pressure. For example, if a waste-gate is commanded open during engine acceleration, and boost pressure is adjusted earlier or later than anticipated, the routine may initiate a procedure to determine the waste-gate actuator opening parameters. Logic or state machines may be used with operating parameters determined in step 201 to determine if it is desirable to learn valve opening parameters. If valve opening parameters are to be determined the routine proceeds to step 211. If not, the routine proceeds to step 205.

In step 205, the routine determines desired boost pressure. In one example, desired boost pressure is determined as a function of engine speed and engine torque demand. Further, desired boost may be adjusted for operating conditions such as atmospheric pressure and intake manifold pressure request (e.g., vacuum requests for brakes and vapor purge). The routine proceeds to step 207.

At step 207, the routine determines if the waste-gate pressure regulator valve can deliver a control pressure that when acting on the actuator diaphragm is capable of providing a force that is greater than the spring force applied to the closed waste-gate actuator diaphragm plus a predetermined force offset. The predetermined force may be an empirically determined constant or it may be varied. In one embodiment, operating conditions described in step 201 may be used to adjust the predetermined force by indexing tables or functions that add or subtract from the empirically predetermined force.

A waste-gate pressure regulator valve is typically comprised of a solenoid that regulates an outlet pressure based on a command signal and pressures at two inlet ports. The command signal instructs the valve to provide an outlet pressure that ranges between the two input pressures. Typically, the two pressures in a waste-gate actuator control system are boost pressure and atmospheric pressure. Thus, a waste-gate actuator control pressure is produced by a controller commanding the waste-gate pressure regulator valve to regulate a pressure between atmospheric pressure and boost pressure. The boost pressure corresponds to the high side of the available control pressure range while atmospheric pressure identifies the low side of the control pressure range. In one example, when the waste-gate control solenoid valve's duty cycle is zero, the boost pressure is limited to a fixed value (e.g., 6"Hg). When its duty cycle is 1, the boost pressure is unregulated (waste-gate closed). In between these limits, boost pressure is controllable by duty cycle selection.

In one embodiment, a table of boost pressure versus waste-gate command duty cycle outputs a command pressure. In addition, a function relates command pressure to the amount of force applied to the opening side of the waste-gate actuator diaphragm. Alternatively, a formula that converts a pressure exerted over the diaphragm area can be used to estimate the amount of force applied to the diaphragm opening side. A second function (i.e., the force function) relates opening force to an open loop estimate of valve position.

The force function may contain a plurality of entries. The force function is initially populated with predetermined entries based on nominal waste-gate closing spring rates. If desired, the force function can be adjusted during engine operation as described in steps 211, 213, 215, and 217 and the description of FIG. 7.

The closing spring force can be determined from the force function by interpolating between the highest force applied to the opening side of the waste-gate actuator diaphragm when the valve remains closed and the amount of force applied to the waste-gate actuator diaphragm when the valve first opens. By determining the amount of force required to open the waste-gate valve, the waste-gate controller can directly command the waste-gate valve to a position without having to start at a zero command and ramp the command until the desired boost pressure is reached. This allows the controller to achieve the desired boost pressure more quickly. In addition, waste-gate position can be determined when a force equal to a predetermined force plus the spring closing force is applied to the waste-gate actuator diaphragm opening side by interpolating between entries in the force function.

The spring closing force plus the above-mentioned predetermined force can be compared to the opening force that is produced by applying the available control pressure to the actuator diaphragm. If the force produced by applying the available control pressure to the opening side of the waste-gate actuator diaphragm is greater than the closing spring force plus the predetermined force, the routine proceeds to step 209. Otherwise, the routine proceeds to step 223.

In step 209, the routine commands the waste-gate pressure regulator valve to regulate boost. In one embodiment, a closed-loop controller is provided for controlling the waste-gate actuator position. The controller combines open-loop commands from the tables and functions described in steps 201, 203, 205, and 207 with feedback from a boost pressure sensor. Boost pressure is controlled to desired boost pressure, step 205, by commanding the waste-gate to a position, and then boost pressure feedback is used to further match the actual boost pressure to the desired boost pressure. Typically, a proportional/integral controller is used to perform this task. After adjusting the waste-gate actuator to substantially match desired boost pressure (e.g., ±0.1 bar), the routine exits.

At step 211, learning of valve opening parameters is commenced. In particular, a control pressure is applied to a waste-gate actuator by commanding the valve pressure regulator to a level above atmospheric pressure when boost pressure is present at one of the pressure regulator inlet ports. Control pressure is applied to the waste-gate actuator diaphragm opening side when boost pressure is high enough to promote waste-gate opening. In one example, the turbo charger controller begins to ramp up the waste-gate command from one to zero (commanding 1 acts to close the waste-gate; commanding 0 acts to open the waste-gate). The routine proceeds to step 213.

At step 213, the routine monitors boost pressure and determines if a boost pressure infection point is present. Boost pressure can be monitored using a pressure transducer located upstream from the turbocharger compressor. If boost pressure is increasing as the valve opening command is increased, the routine determines if the boost pressure slope has changed. If boost pressure is substantially constant when the valve begins to open boost pressure should begin to be reduced.

Figure 7:
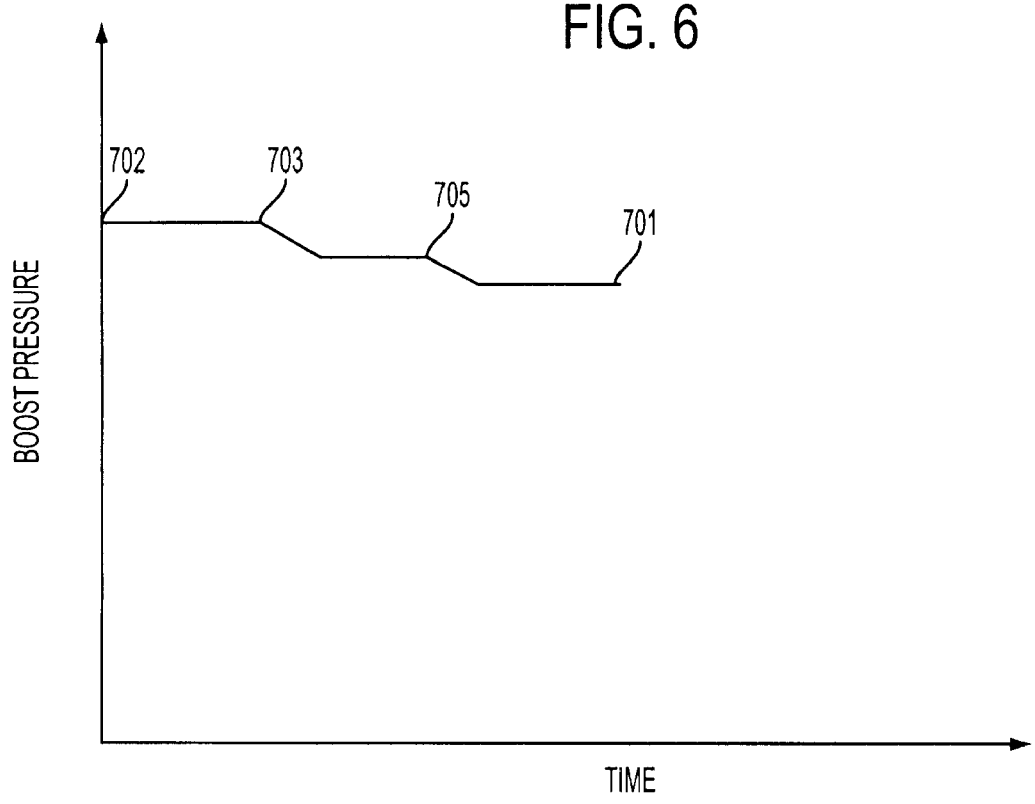
FIG. 7 is a plot illustrating one way to determine waste-gate spring forces acting on a waste-gate actuator diaphragm.

If an inflection point is determined (e.g., by a change in boost slope), the control pressure and force at which the inflection is observed are stored in memory. Storing the variables to memory acts to update and adjust the spring closing force in the force function described in step 207. FIG. 7 describe one example way to determine waste-gate spring closing force. The routine then proceeds to step 215 after storing parameters to memory unless the system only incorporates a single turbo charger. If a single turbo charger is present the routine proceeds to step 205.

If an infection of boost pressure is not observed, the routine returns to step 211 where the control pressure command is increased. In this way, the control pressure command is ramped until the waste-gate spring closing force is determined.

At step 215, the routine begins learning waste-gate valve opening parameters for a second turbo charger. Like the operation described in step 211, the turbo charger controller begins to ramp the turbo charger control pressure command and then proceeds to step 215.

At step 217, the routine determines if an inflection point in the boost pressure is observed for the second turbocharger. If not, the routine proceeds to step 215 where the waste-gate control command is increased further. If so, the control pressure and force at which the inflection is observed are adjusted and stored in memory and the routine proceeds to step 205. Storing the variables to memory acts to update and adjust the spring closing force in the force function described in step 207.

At step 223, the routine commands waste-gates to the closed position. Commanding the waste-gate to the closed position can be accomplished in a variety of ways. For example, for operating conditions where boost pressure is low, a command may be issued that allows the full boost pressure to be routed to the opening side of the waste-gate actuator diaphragm. This method may be used until the force produced by the boost approaches the amount of force produced by the waste-gate closing spring. If the force produced by the boost pressure acting on the waste-gate diaphragm approaches the closing spring force, the control pressure applied to the waste-gate diaphragm can be reduced by regulating the pressure control valve output. That is, the pressure developed at the control valve output can be set between the boost pressure and atmospheric pressure. The pressure on the waste-gate diaphragm can be held to a level such that the force acting on the opening side of the waste-gate diaphragm is less than the closing spring force by a predetermined amount of force.

In another example, a command can be sent to the waste-gate pressure control valve that regulates the valve output such that the pressure on the waste-gate opening diaphragm is between boost pressure and atmospheric pressure anytime the control pressure force is less than closing spring force plus a predetermined force. The control pressure in this mode of operation is maintained at a level that produces less force on the opening side of the waste-gate actuator diaphragm than the closing spring force.

Figure 5:
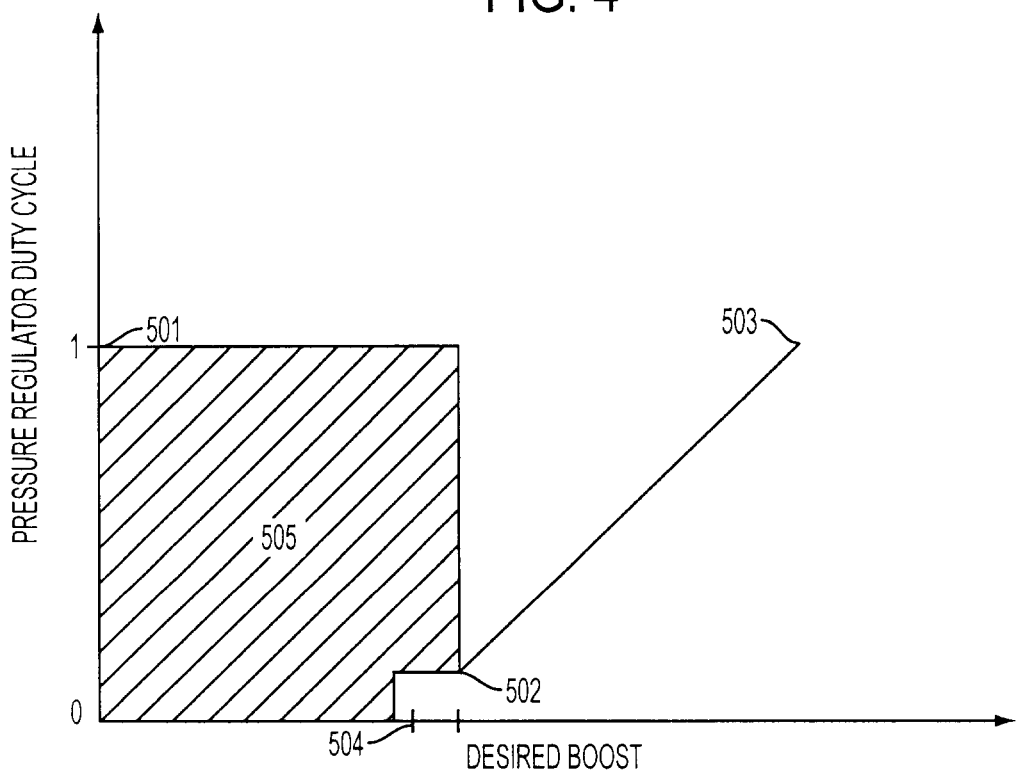
FIG. 5 is a plot illustrating waste-gate pressure regulator control of the present method.

FIG. 5 provides an example plot of control pressure regulation described in FIG. 2. After the commands to close the waste-gates are delivered the routine proceeds to exit.

Figure 3:
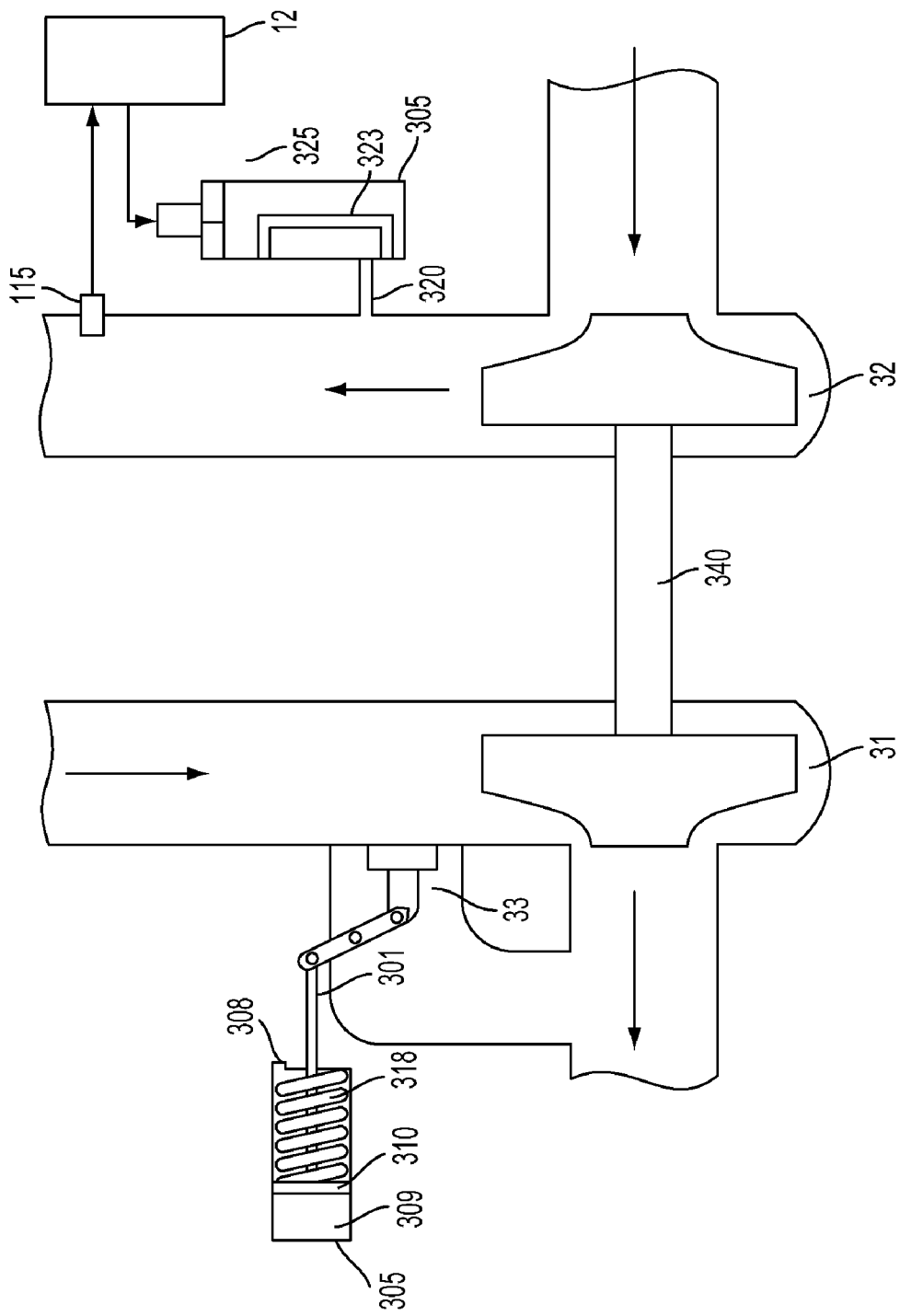
FIG. 3 is a schematic diagram of a spring assisted diaphragm operated waste-gate actuator control system.

Referring now to FIG. 3, a schematic diagram of a spring assisted diaphragm operated waste-gate actuator control system is shown. The figure illustrates a single turbocharger but a system having two turbochargers can be configured likewise.

The turbocharger is comprised of an exhaust impeller 31 that is attached to a compressor 32 via shaft 340. Exhaust gases from engine cylinders provide the energy that causes the impeller to rotate. The turbocharger is configured with a waste-gate 33 that reduces turbocharger efficiency when opened. Waste-gate 33 is operated by spring assisted actuator 301. Spring 318 normally holds the waste-gate in the closed position by applying force to diaphragm 310. The spring side of actuator 301 is also vented to atmosphere by vent 308. Solenoid 305 can be used to regulate the position of diaphragm 310 by applying pressure to chamber 309. Waste-gate control solenoid 305 connects chamber 309 to atmospheric pressure by channel 325 or to boost pressure by channel 323. The solenoid is shown in the vent to atmospheric pressure position. Controller 12 can provide a modulated signal to solenoid 305 so that pressure in chamber 309 is regulated between atmospheric pressure and boost pressure. When pressure is increased to chamber 309, the spring closing force applied to diaphragm 310 by spring 318 can be overcome, thereby opening the waste-gate 33.

Controller 12 adjusts the pressure in chamber 309 by adjusting the duty cycle supplied to solenoid control valve 305. The duty cycle is varied in response to feedback from pressure sensor 115. In one example, as described above, control pressure is related to waste-gate position and waste-gate position at selected engine operating conditions is related to a predetermined boost pressure. In this way, a control pressure can be related to a desired amount of boost. If the actual boost pressure, which is determined from pressure sensor 15, does not match the desired boost pressure, adjustments can be made to the control signal that is applied to regulator valve 305 in order to adjust waste-gate position.

Figure 4:
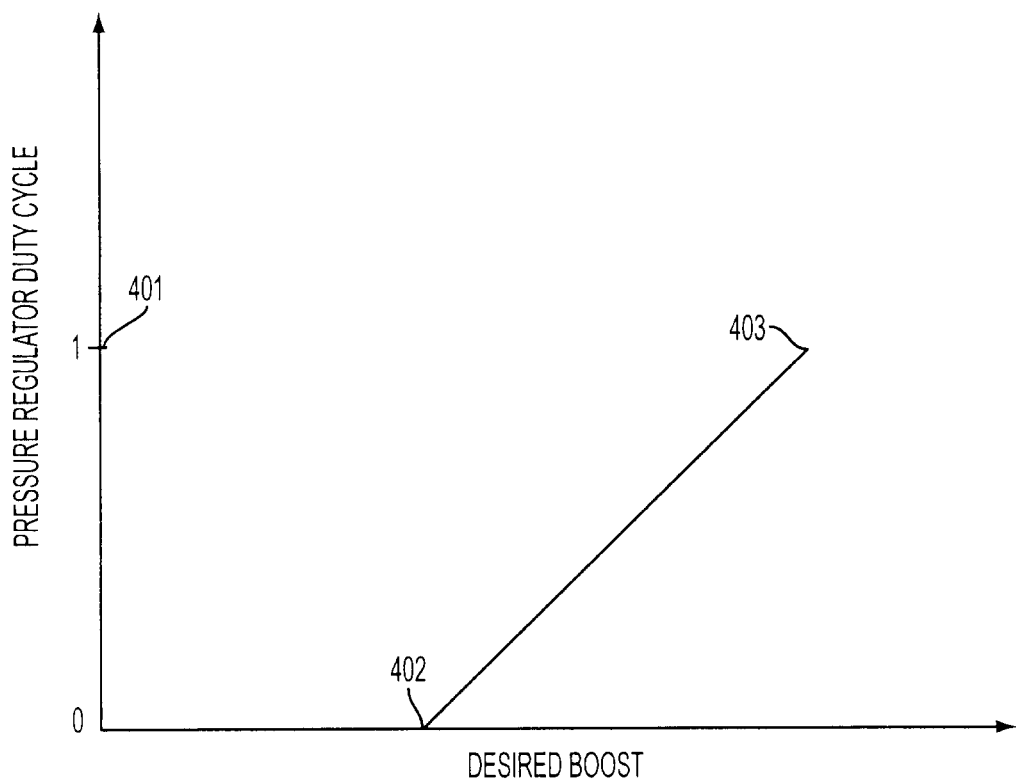
FIG. 4 is a plot illustrating waste-gate pressure regulator control of the prior art.

Referring now to FIG. 4, a plot that illustrates prior art waste-gate control commands is shown. The Y axis represents duty cycle applied to the waste-gate pressure control valve. In this example, zero corresponds to no voltage being applied to the valve. One (at label 401) represents full voltage being applied to the valve. And a value of 0.5 represents 50% voltage on time at a predetermined control frequency. The X axis represents desired boost pressure generated by the turbocharger. Desired boost pressure increases from left to right.

Also note that higher boost pressures are typically available at higher engine speeds because higher engine mass flow rates deliver more exhaust energy to the turbocharger.

This example plot illustrates a pressure regulator that connects boost pressure to the waste-gate actuator diaphragm opening side when no voltage is applied to the pressure control valve. The control command is held at zero until desired boost pressure reaches a level that calls for lowering the diaphragm opening pressure below boost pressure so that boost pressure can be regulated by adjusting the waste-gate opening amount, see 402. At this point, the force produced by boost pressure acting on the waste-gate actuator diaphragm is close to the closing spring force and flow through the waste-gate is minimal. This is the operating point at which system dynamics and adjusting the control pressure can cause the waste-gate closing apparatus to flutter or rapidly open and close in an undesirable manner. Thus, applying a duty cycle to the pressure regulator allows the turbocharger to develop a desired boost pressure, but the system can exhibit waste-gate flutter under some conditions.

The control command duty cycle is shown increasing from 402 to 403. The waste-gate moves from a full closed position to a full open position so that some exhaust gas energy bypasses the turbocharger at higher engine mass flow conditions. This action allows controller 12 to regulate turbocharger boost pressure.

Referring now to FIG. 5, a plot that illustrates an example of the present method is shown. The X and Y axis of FIG. 5 are the same as illustrated in FIG. 4. Label 501 represents full voltage applied to the waste-gate pressure control valve. Label 504 represents the position at which a duty cycle is applied in FIG. 4.

In this example, the pressure command can occupy region 505, a small region is excluded near label 504 where the duty cycle may not be sufficient to ensure positive waste-gate opening and closing. The size of this region is for illustration purposes only and not intended to limit the description. Label 502 represents a desired boost pressure at which the waste-gate is allowed to begin to open. This pressure is also shown for illustration purposes and is not intended to limit the scope or breadth of this description. Notice that this boost pressure is higher than the boost pressure at 504 (and higher than the desired boost pressure at 402) and that the duty cycle is non-zero. The higher boost pressure and non-zero duty cycle increase the possibility of positive waste-gate opening and closing. Higher boost pressure increases the amount of force that is available to open the waste-gate and the duty cycle opens the waste-gate to a position that has a higher flow rate. These actions can decrease the possibility of waste-gate flutter. In an example, the duty cycle is set to one until waste-gate opening is allowed. Waste-gate opening is not allowed until the expected waste-gate flowrate is non-zero.

Like the control command described in FIG. 4, the control command duty cycle increases from 502 to 503. As explained above, this causes the waste-gate actuator to move from a closed position to an open position as mass flow through the engine increases.

Figure 6:
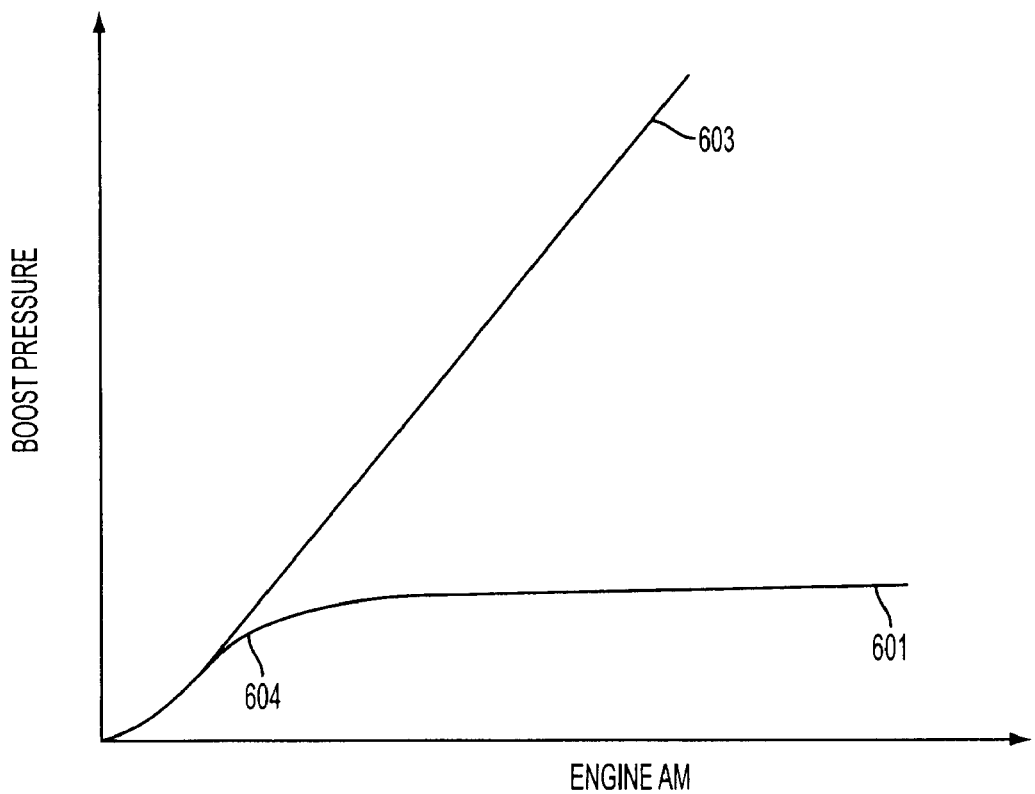
FIG. 6 is a plot illustrating waste-gate based boost pressure regulation.

Referring now to FIG. 6, a plot of different turbocharger operating modes is shown. The Y axis represents boost pressure developed by a turbocharger while the X axis represents air mass flow through the engine.

Curve 603 represents the amount of turbocharger boost developed when the turbocharger waste-gate is held in a closed position. This curve essentially represents the turbocharger's capacity to generate boost. Curve 601 illustrates boost generated by a turbocharger having boost pressure in direct communication with a spring return waste-gate actuator. At 604, the boost pressure reaches a level that overcomes the waste-gate actuator closing spring force and opens the waste-gate. This allows engine exhaust gases to bypass the turbocharger, thereby limiting the boost from 604 to the end of 601. By controlling pressure on the opening side of the waste-gate actuator diaphragm, boost pressures between curve 603 and 601 may be produced.

Opening of a waste-gate can be characterized by holding both waste-gates of a twin parallel turbocharged engine closed then subsequently varying the control of a single waste-gate to determine at what duty cycle command the waste-gate begins to open. Waste-gate opening can be noted by a reduction in boost pressure.

Referring now to FIG. 7, a plot of an example way to determine waste-gate actuator spring closing forces for a twin turbocharger system is shown. The X represents boost pressure at substantially constant engine operating conditions. The Y axis represents time. Curve 701 represents the amount of boost pressure developed at different waste-gate operating conditions. At 702, both turbocharger waste-gates are held in a closed position and the boost pressure is substantially constant. Before 703, a commanded duty cycle is ramped to a first waste-gate actuator control pressure regulation valve that causes the waste-gate to open. The force created by the control pressure acting on the waste-gate actuator diaphragm opening side when the boost pressure begins to decrease (i.e., the inflection point) is the valve closing force used to update the force function described in the method of FIG. 2. After the first waste-gate at least partially opens, it is maintained in a partially open position while a command to open the second waste-gate is issued. Positioning the waste-gate in a partially open location allows both turbochargers to continue to pump while the waste-gate actuator closing spring force is determined. Alternatively, the first waste-gate can be closed while a command to open the second waste-gate is issued. When the opening force applied to the second waste-gate by commanding the pressure control valve exceeds the closing spring force the second waste-gate begins to open and the boost pressure begins to decrease at 705. This method allows for the determination of spring closing forces for each turbocharger of a multiple turbocharged engine.

As an alternative, closing spring forces may be determined when mass flow through an engine is changing (e.g., during acceleration) by monitoring a change in boost pressure slope as the waste-gate opening command is ramped from a full close command to an open command. Once the first turbocharger reaches an open condition, the second turbocharger command begins to be ramped from a close command to an open command. The waste-gate closing spring force can again be determined by monitoring the boost pressure for a change in slope. As mentioned above, the force function described in the method of FIG. 2 can be adjusted and stored to memory when the waste-gate actuator spring closing force is determined.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method to operate a turbocharger and a waste-gate in an internal combustion engine, said waste-gate having a spring assisted waste-gate closing mechanism, the method comprising:
 applying a first force to operate a waste-gate actuator;
 applying a second force by a spring acting in opposition to said first force, said second force being the force applied when said waste-gate is in a closed position;
 in a first condition, wherein a desired boost pressure is not met, commanding said first force to a level that is less than said second force when a desired force of said first force is less than said second force plus a predetermined force offset; and
 in a second condition, wherein the desired boost pressure is met, commanding said first force to a level that is greater than said second force plus said predetermined force offset when said desired force of said first force is greater than said second force plus said predetermined force offset.

2. The method of claim 1 wherein said first force is a pneumatically generated force, hydraulically generated force, or electrically generated force.

3. The method of claim 1 wherein said first force is applied to a diaphragm actuator.

4. The method of claim 1 wherein said method is applied to two waste-gate actuators of an engine having two turbochargers.

5. The method of claim 1 wherein said predetermined force offset is varied depending on operating conditions.

6. The method of claim 1 wherein said predetermined force is varied based on said second force.

7. The turbocharger of claim 1, wherein said turbocharger is coupled to an engine exhaust and said waste-gate is disposed upstream of said turbocharger in an exhaust duct, a waste-gate pressure regulator valve regulating a pressure by applying said first force to operate said waste-gate actuator, said waste-gate pressure regulator valve controlled by a controller.

8. A method to operate a turbocharger in an internal combustion engine having a waste-gate disposed proximate to a turbine of the turbocharger, said waste-gate having a spring assisted waste-gate closing mechanism and a waste-gate pressure regulator valve, the method comprising:
 regulating a pressure via said waste-gate pressure regulator valve, said pressure between a boost pressure produced by said turbocharger and atmospheric pressure, said pressure used to produce a first force on a first side of a turbocharger waste-gate actuator diaphragm, a second force provided by a spring acting on a second side of said waste-gate actuator diaphragm when said waste-gate is in a closed position;
 regulating said pressure such that said first force is less than said second force until said boost pressure is at a desired boost pressure; and
 regulating said pressure such that said first force is greater than said second force plus a predetermined force when said boost pressure is at said desired boost pressure.

9. The method of claim 8 wherein said method is applied to two waste-gate actuators of an engine having two turbochargers.

10. The method of claim 9 wherein said two waste-gate actuators are opened substantially concurrently.

11. The method of claim 8 wherein said pressure is regulated by a solenoid.

12. The method of claim 11 wherein said solenoid is configured to connect boost pressure created by said turbocharger directly to said diaphragm when power is not applied to said solenoid.

13. The method of claim 11 wherein a modulated voltage is delivered to said solenoid to adjust said pressure on said first side of said diaphragm.

14. The method of claim 8 wherein said boost pressure is monitored by a sensor.

15. The method of claim 8 wherein said predetermined force is varied depending on one or more of turbocharger conditions, ambient temperature, ambient pressure, engine operating time, and engine operating conditions including one or more of engine speed, driver torque demand, and cylinder air charge.

16. The turbocharger of claim 8, wherein said turbocharger is coupled to an engine exhaust and said waste-gate is disposed upstream of said turbocharger in an exhaust duct, said waste-gate pressure regulator valve applying said pressure on said waste-gate actuator diaphragm from one or more of atmospheric pressure and said boost pressure, said waste-gate pressure regulator valve controlled by a controller.

17. A non-transitory computer readable storage medium having stored data representing instructions executable by a computer to control a turbocharger that compresses air entering an internal combustion engine of a vehicle, said storage medium comprising:
  instructions for regulating a pressure, said pressure between a boost pressure produced by said turbocharger and atmospheric pressure, said pressure used to produce a first force on a first side of a turbocharger waste-gate actuator diaphragm, said first force in opposition to a second force provided by a spring acting on a second side of said waste-gate actuator diaphragm when said waste-gate is in a closed position;
  instructions for regulating said pressure such that said first force is less than said second force until said boost pressure is at a desired boost pressure; and
  instructions for regulating said pressure such that said boost pressure substantially matches the desired boost pressure when said boost pressure is at a level that allows said pressure to increase said first force to a force greater than said second force plus a predetermined force.

18. The non-transitory computer readable storage medium of claim 17 further comprising instructions to monitor a boost pressure sensor.

19. The non-transitory computer readable storage medium of claim 17 further comprising instructions to vary said predetermined force depending on operating conditions including one or more of turbocharger conditions, ambient temperature, ambient pressure, engine operating time, and engine operating conditions including one or more of engine speed, driver torque demand, and cylinder air charge.

20. A system to operate a turbocharger having a spring assisted waste-gate closing mechanism in an internal combustion engine, the system comprising:
  a normally closed turbocharger waste-gate;
  a spring providing a first force to hold said turbocharger waste-gate in said normally closed position;
  an electrically actuated pressure regulation valve used to regulate a control pressure that provides a second force to said waste-gate, said second force being in opposition to said first force, said electrically actuated valve capable of regulating said control pressure between atmospheric pressure and a boost pressure generated by said turbocharger; and
  a controller that supplies a command to said electrically actuated pressure regulation valve that acts to limit said second force to a level that is less than said first force plus a predetermined force until said boost pressure generated by said turbocharger is at a level that allows said electrically actuated pressure regulation valve to regulate said control pressure such that said second force is greater than said first force plus said predetermined force, and said controller commanding said pressure regulation valve to regulate said control pressure to adjust an opening amount of said waste-gate when said boost pressure generated by said turbocharger is at a level that allows said electrically actuated pressure regulation valve to regulate said control pressure such that said second force is greater than said first force plus said predetermined force.

21. The system of claim 20 wherein said controller substantially linearly regulates said boost pressure generated by said turbocharger for boost pressures generated by said turbocharger that are at a level that allows said electrically actuated pressure regulation valve to regulate said control pressure such that said second force is greater than said first force plus said predetermined force.

22. The system of claim 20 wherein said boost pressure is monitored by a sensor.

23. The system of claim 20 wherein said electrically actuated pressure regulation valve is configured to connect boost pressure created by said turbocharger directly to a first diaphragm when power is not applied to said electrically actuated pressure regulation valve.

24. The turbocharger of claim 20, wherein said turbocharger is coupled to an engine exhaust and said waste-gate is disposed upstream of said turbocharger in an exhaust duct, said waste-gate regulated by said electrically actuated pressure regulation valve, said electrically actuated pressure regulation valve applying said second force.

* * * * *